United States Patent
Bedingfield, Sr. et al.

(10) Patent No.: US 10,524,014 B2
(45) Date of Patent: *Dec. 31, 2019

(54) REMOTE CONTROL VIA LOCAL AREA NETWORK

(71) Applicant: AT&T Intellectual Property I, L.P., Atlanta, GA (US)

(72) Inventors: James Carlton Bedingfield, Sr., Gainesville, GA (US); David A. Levine, Smyrna, GA (US); John A. McClenny, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,101

(22) Filed: Nov. 14, 2016

(65) Prior Publication Data
US 2017/0064406 A1    Mar. 2, 2017

Related U.S. Application Data

(63) Continuation of application No. 14/537,748, filed on Nov. 10, 2014, now Pat. No. 9,497,516, which is a
(Continued)

(51) Int. Cl.
*H04N 21/61* (2011.01)
*H04L 12/28* (2006.01)
(Continued)

(52) U.S. Cl.
CPC ..... *H04N 21/6125* (2013.01); *H04L 12/2818* (2013.01); *H04L 12/2836* (2013.01); *H04L 12/66* (2013.01); *H04L 67/125* (2013.01); *H04N 21/2541* (2013.01); *H04N 21/4113* (2013.01); *H04N 21/4126* (2013.01);
(Continued)

(58) Field of Classification Search
CPC ......... H04N 21/4126; H04N 21/42204; H04N 21/42207; H04N 21/42208; H04N 21/42219; H04N 21/4222; H04N 21/42221; H04N 21/42224; H04N 21/42225; H04N 21/42226; H04N 21/441; H04N 21/4627; H04N 21/4753; H04N 21/6125;
(Continued)

(56) References Cited

U.S. PATENT DOCUMENTS 5,850,606 A    12/1998  Bedingfield, Sr.
6,223,029 B1   4/2001   Stenman et al.
(Continued)

*Primary Examiner* — Hai V Tran
(74) *Attorney, Agent, or Firm* — Jackson Walker L.L.P.

(57) ABSTRACT

A method and system for remote control of multimedia content using a multimedia content distribution network (MCDN) is configured to establish a connection between a customer premises equipment (CPE) gateway and a local area network (LAN) device that is a personal user device. A user of the LAN device may be authenticated. Responsive to user input, the LAN device may send remote control messages corresponding to remote control functions for an MCDN terminal device. The CPE gateway may determine a network address for the MCDN terminal device, and forward the remote control messages to the addressed MCDN terminal device. The LAN device may so remotely control the addressed MCDN terminal device.

18 Claims, 7 Drawing Sheets

Related U.S. Application Data continuation of application No. 12/636,407, filed on Dec. 11, 2009, now Pat. No. 8,885,552.

(51) Int. Cl.

| | |
|---|---|
| *H04L 12/66* | (2006.01) |
| *H04N 21/422* | (2011.01) |
| *H04L 29/08* | (2006.01) |
| *H04N 21/41* | (2011.01) |
| *H04N 21/6587* | (2011.01) |
| *H04N 21/254* | (2011.01) |
| *H04N 21/4627* | (2011.01) |
| *H04N 21/475* | (2011.01) |
| *H04N 21/6336* | (2011.01) |
| *H04W 84/12* | (2009.01) |
| *H04L 29/06* | (2006.01) |

(52) U.S. Cl.
CPC ... *H04N 21/4222* (2013.01); *H04N 21/42204* (2013.01); *H04N 21/42207* (2013.01); *H04N 21/42221* (2013.01); *H04N 21/4627* (2013.01); *H04N 21/4753* (2013.01); *H04N 21/6336* (2013.01); *H04N 21/6587* (2013.01); *H04W 84/12* (2013.01); *H04L 65/4076* (2013.01)

(58) Field of Classification Search
CPC ............. H04L 12/2818; H04L 12/2836; H04L 67/125; H04W 84/12
See application file for complete search history.

(56) References Cited

U.S. PATENT DOCUMENTS

| | | | |
|---|---|---|---|
| 6,608,888 | B2 | 8/2003 | Bedingfield et al. |
| 6,628,761 | B1 | 9/2003 | Adamczyk et al. |
| 6,633,633 | B1 | 10/2003 | Bedingfield |
| 6,665,388 | B2 | 12/2003 | Bedingfield |
| 6,681,257 | B1 | 1/2004 | Patel et al. |
| 6,724,863 | B1 | 4/2004 | Bedingfield |
| 6,757,274 | B1 | 6/2004 | Bedingfield et al. |
| 6,810,113 | B1 | 10/2004 | Bedingfield et al. |
| 6,816,582 | B2 | 11/2004 | Levine et al. |
| 6,842,506 | B1 | 1/2005 | Bedingfield |
| 6,853,718 | B1 | 2/2005 | Bedingfield, Sr. et al. |
| 6,868,268 | B2 | 3/2005 | Worsham et al. |
| 6,879,683 | B1 | 4/2005 | Fain et al. |
| 6,882,708 | B1 | 4/2005 | Bedingfield et al. |
| 6,947,534 | B2 | 9/2005 | Levine et al. |
| 6,978,004 | B1 | 12/2005 | Levine et al. |
| 6,980,635 | B2 | 12/2005 | Bedingfield et al. |
| 6,993,014 | B2 | 1/2006 | Bedingfield et al. |
| 7,006,829 | B2 | 2/2006 | Zhao et al. |
| 7,035,385 | B2 | 4/2006 | Levine et al. |
| 7,095,834 | B2 | 8/2006 | Bedingfield et al. |
| 7,103,168 | B2 | 9/2006 | Bedingfield, Sr. et al. |
| 7,103,170 | B2 | 9/2006 | Fain et al. |
| 7,127,051 | B2 | 10/2006 | Bedingfield et al. |
| 7,136,460 | B2 | 11/2006 | Bedingfield |
| 7,194,080 | B2 | 3/2007 | Worsham |
| 7,203,293 | B1 | 4/2007 | Bedingfield |
| 7,233,656 | B2 | 6/2007 | Bedingfield, Sr. |
| 7,257,212 | B2 | 8/2007 | Bedingfield et al. |
| 7,274,784 | B2 | 9/2007 | Bedingfield, Sr. et al. |
| 7,292,588 | B2 | 11/2007 | Milley et al. |
| 7,315,614 | B2 | 1/2008 | Bedingfield, Sr. et al. |
| 7,319,742 | B2 | 1/2008 | Levine |
| 7,352,855 | B2 | 4/2008 | Bedingfield, Sr. et al. |
| 7,382,872 | B2 | 6/2008 | Bedingfield |
| 7,388,949 | B2 | 6/2008 | Contractor et al. |
| 7,389,089 | B1 | 6/2008 | Nguyen et al. |
| 7,394,895 | B2 | 7/2008 | Bedingfield et al. |
| 7,394,897 | B1 | 7/2008 | Bedingfield, Sr. et al. |
| 7,403,768 | B2 | 7/2008 | Bedingfield, Sr. et al. |
| 7,433,974 | B2 | 10/2008 | Bedingfield, Sr. et al. |
| 7,450,945 | B2 | 11/2008 | Bedingfield |
| 7,464,110 | B2 | 12/2008 | Pyhalammi et al. |
| 7,469,043 | B1 | 12/2008 | McDonald et al. |
| 7,512,222 | B2 | 3/2009 | Bedingfield et al. |
| 7,558,277 | B2 | 7/2009 | Bedingfield, Sr. |
| 7,593,605 | B2 | 9/2009 | King et al. |
| 7,599,481 | B2 | 10/2009 | Bedingfield |
| 7,609,820 | B2 | 10/2009 | Bedingfield, Sr. |
| 7,640,507 | B2 | 10/2009 | Bedingfield, Sr. |
| 7,623,646 | B2 | 11/2009 | Bedingfield, Sr. |
| 7,627,341 | B2 | 12/2009 | Wu |
| 7,627,819 | B2 | 12/2009 | Bedingfield, Sr. |
| 7,646,856 | B2 | 1/2010 | Bedingfield et al. |
| 7,664,244 | B2 | 2/2010 | Bedingfield |
| 7,676,753 | B2 | 3/2010 | Bedingfield |
| 7,711,102 | B2 | 5/2010 | Worsham et al. |
| 7,733,213 | B2 | 6/2010 | Levine |
| 7,773,982 | B2 | 8/2010 | Bishop et al. |
| 7,796,980 | B1 | 9/2010 | McKinney et al. |
| 7,802,205 | B2 | 9/2010 | Bedingfield |
| 7,814,353 | B2 | 10/2010 | Naitou et al. |
| 7,881,702 | B2 | 2/2011 | Heyworth et al. |
| 7,885,272 | B2 | 2/2011 | Burger et al. |
| 7,890,136 | B1 | 2/2011 | Fujisaki |
| 7,894,589 | B2 | 2/2011 | Bedingfield, Sr. |
| 7,895,157 | B2 | 2/2011 | Bedingfield, Sr. |
| 7,903,802 | B2 | 3/2011 | Bedingfield |
| 7,904,041 | B2 | 3/2011 | Feher |
| 7,904,069 | B2 | 3/2011 | Rye et al. |
| 7,907,213 | B1 | 3/2011 | Biere et al. |
| 7,913,278 | B2 | 3/2011 | Ellis et al. |
| 7,920,580 | B2 | 4/2011 | Bedingfield, Sr. |
| 7,925,990 | B2 | 4/2011 | Bedingfield, Sr. et al. |
| 7,933,390 | B2 | 4/2011 | Bedingfield et al. |
| 7,953,217 | B2 | 5/2011 | Fain et al. |
| 7,970,863 | B1 * | 6/2011 | Fontaine ............... H04L 41/00 709/217 |
| 7,975,283 | B2 | 7/2011 | Bedingfield, Sr. |
| 7,978,836 | B2 | 7/2011 | Bedingfield et al. |
| 7,983,408 | B2 | 7/2011 | Bedingfield, Sr. et al. |
| 2002/0076022 | A1 | 6/2002 | Bedingfield |
| 2002/0085542 | A1 | 7/2002 | Bedingfield et al. |
| 2002/0085687 | A1 | 7/2002 | Contractor et al. |
| 2002/0110227 | A1 | 8/2002 | Bedingfield et al. |
| 2002/0143812 | A1 | 10/2002 | Bedingfield |
| 2003/0002645 | A1 | 1/2003 | Worsham et al. |
| 2003/0003927 | A1 | 1/2003 | Worsham et al. |
| 2003/0063733 | A1 | 4/2003 | Levine et al. |
| 2003/0165219 | A1 | 9/2003 | Bedingfield et al. |
| 2003/0231759 | A1 | 12/2003 | Bedingfield, Sr. et al. |
| 2004/0101124 | A1 | 5/2004 | Koch et al. |
| 2004/0110465 | A1 | 6/2004 | Bedingfield et al. |
| 2004/0156492 | A1 | 8/2004 | Bedingfield, Sr. |
| 2004/0158855 | A1 | 8/2004 | Gu et al. |
| 2004/0174978 | A1 | 9/2004 | Bedingfield et al. |
| 2004/0203798 | A1 | 10/2004 | Bedingfield |
| 2004/0213393 | A1 | 10/2004 | Bedingfield et al. |
| 2004/0228466 | A1 | 11/2004 | Bedingfield, Sr. et al. |
| 2004/0229620 | A1 | 11/2004 | Zhao et al. |
| 2004/0248560 | A1 | 12/2004 | Bedingfield, Sr. et al. |
| 2004/0258220 | A1 | 12/2004 | Levine et al. |
| 2004/0260604 | A1 | 12/2004 | Bedingfield, Sr. |
| 2004/0264655 | A1 | 12/2004 | Levine |
| 2005/0034147 | A1 | 2/2005 | Best, Jr. et al. |
| 2005/0041792 | A1 | 2/2005 | Bedingfield, Sr. |
| 2005/0050460 | A1 | 3/2005 | Bedingfield, Sr. |
| 2005/0053215 | A1 | 3/2005 | Bedingfield, Sr. |
| 2005/0053223 | A1 | 3/2005 | Bedingfield |
| 2005/0100143 | A1 | 5/2005 | Bedingfield, Sr. |
| 2005/0117728 | A1 | 6/2005 | Levine et al. |
| 2005/0152363 | A1 | 7/2005 | Malik et al. |
| 2005/0232409 | A1 | 10/2005 | Fain et al. |
| 2005/0239445 | A1 * | 10/2005 | Karaoguz .......... H04N 21/4126 455/414.1 |
| 2005/0259804 | A1 | 11/2005 | Bedingfield |
| 2006/0003758 | A1 | 1/2006 | Bishop et al. |
| 2006/0004834 | A1 | 1/2006 | Pyhalammi et al. |
| 2006/0046706 | A1 | 3/2006 | Lin et al. |

(56) References Cited

U.S. PATENT DOCUMENTS

| | | |
|---|---|---|
| 2006/0050857 A1 | 3/2006 | Bedingfield et al. |
| 2006/0126646 A1 | 6/2006 | Bedingfield, Sr. |
| 2006/0156242 A1 | 7/2006 | Bedingfield |
| 2006/0156255 A1 | 7/2006 | Bedingfield |
| 2006/0172700 A1 | 8/2006 | Wu |
| 2006/0203620 A1 | 9/2006 | Bedingfield, Sr. |
| 2006/0218193 A1 | 9/2006 | Gopalakrishnan |
| 2006/0221826 A1 | 10/2006 | Bedingfield, Sr. et al. |
| 2006/0222008 A1 | 10/2006 | Aaron et al. |
| 2006/0222015 A1 | 10/2006 | Kafka et al. |
| 2006/0224988 A1 | 10/2006 | Bedingfield, Sr. |
| 2006/0225106 A1 | 10/2006 | Bedingfield, Sr. |
| 2006/0251116 A1 | 11/2006 | Bedingfield, Sr. et al. |
| 2006/0256957 A1 | 11/2006 | Fain et al. |
| 2007/0060054 A1 | 3/2007 | Romesburg |
| 2007/0064911 A1 | 3/2007 | Bedingfield, Sr. et al. |
| 2007/0101263 A1 | 5/2007 | Bedingfield, Sr. |
| 2007/0116249 A1 | 5/2007 | Bedingfield, Sr. et al. |
| 2007/0121806 A1 | 5/2007 | Bedingfield |
| 2007/0121868 A1 | 5/2007 | Bedingfield et al. |
| 2007/0121889 A1 | 5/2007 | Bedingfield et al. |
| 2007/0124414 A1 | 5/2007 | Bedingfield, Sr. et al. |
| 2007/0124499 A1 | 5/2007 | Bedingfield, Sr. et al. |
| 2007/0124500 A1 | 5/2007 | Bedingfield, Sr. et al. |
| 2007/0124597 A1 | 5/2007 | Bedingfield, Sr. |
| 2007/0165827 A1 | 7/2007 | Worsham et al. |
| 2007/0206748 A1 | 9/2007 | Cassanova et al. |
| 2007/0206750 A1 | 9/2007 | Bedingfield |
| 2007/0242817 A1 | 10/2007 | Bedingfield, Sr. |
| 2007/0256007 A1 | 11/2007 | Bedingfield, Sr. |
| 2007/0256008 A1 | 11/2007 | Bedingfield, Sr. |
| 2007/0256016 A1 | 11/2007 | Bedingfield, Sr. |
| 2007/0256030 A1 | 11/2007 | Bedingfield, Sr. |
| 2007/0263884 A1 | 11/2007 | Bedingfield, Sr. |
| 2007/0273474 A1 | 11/2007 | Levine |
| 2007/0274491 A1 | 11/2007 | Bedingfield et al. |
| 2007/0297595 A1 | 12/2007 | Bedingfield, Sr. et al. |
| 2008/0075263 A1 | 3/2008 | Levine |
| 2008/0095335 A1 | 4/2008 | Bedingfield et al. |
| 2008/0107251 A1 | 5/2008 | Bedingfield, Sr. et al. |
| 2008/0109823 A1 | 5/2008 | Whitfield et al. |
| 2008/0110991 A1 | 5/2008 | Bedingfield |
| 2008/0120094 A1 | 5/2008 | Mate et al. |
| 2008/0120556 A1 | 5/2008 | Bedingfield et al. |
| 2008/0159509 A1 | 7/2008 | Whitefield et al. |
| 2008/0163307 A1 | 7/2008 | Coburn et al. |
| 2008/0196066 A1 | 8/2008 | Matz |
| 2008/0201755 A1* | 8/2008 | Okamoto ........... H04N 7/17318 725/117 |
| 2008/0226056 A1 | 9/2008 | Bedingfield |
| 2008/0238755 A1 | 10/2008 | Cruz et al. |
| 2008/0261686 A1 | 10/2008 | Bedingfield |
| 2009/0016516 A1 | 1/2009 | McDonald et al. |
| 2009/0016519 A1 | 1/2009 | Bedingfield, Sr. et al. |
| 2009/0088221 A1 | 4/2009 | Gilbert et al. |
| 2009/0109278 A1 | 4/2009 | Karnalkar et al. |
| 2009/0132610 A1 | 5/2009 | Bedingfield, Sr. |
| 2009/0137298 A1 | 5/2009 | Bedingfield, Sr. et al. |
| 2009/0150425 A1 | 6/2009 | Bedingfield, Sr. |
| 2009/0153289 A1 | 6/2009 | Hope et al. |
| 2009/0217356 A1 | 8/2009 | Scott et al. |
| 2009/0232149 A1 | 9/2009 | Bedingfield, Sr. |
| 2009/0269025 A1 | 10/2009 | Bedingfield, Sr. et al. |
| 2009/0269027 A1 | 10/2009 | Bedingfield, Sr. et al. |
| 2009/0298535 A1* | 12/2009 | Klein ............... H04N 21/43615 455/556.1 |
| 2009/0300671 A1 | 12/2009 | Scott et al. |
| 2009/0316866 A1 | 12/2009 | Bedingfield et al. |
| 2010/0058179 A1 | 3/2010 | Bedingfield, Sr. |
| 2010/0058246 A1 | 3/2010 | Bedingfield, Sr. |
| 2010/0067678 A1 | 3/2010 | Bedingfield, Sr. |
| 2010/0088610 A1 | 4/2010 | Bedingfield, Sr. |
| 2010/0111281 A1 | 5/2010 | Levine |
| 2010/0125890 A1 | 5/2010 | Levine et al. |
| 2010/0137020 A1 | 6/2010 | Rofougaran |
| 2010/0138224 A1 | 6/2010 | Bedingfield, Sr. |
| 2010/0142693 A1 | 6/2010 | Bedingfield |
| 2010/0144310 A1 | 6/2010 | Bedingfield, Sr. et al. |
| 2010/0145890 A1 | 6/2010 | Donovan et al. |
| 2010/0162328 A1 | 6/2010 | Karaoguz et al. |
| 2010/0179701 A1 | 7/2010 | Gilbert et al. |
| 2010/0180297 A1 | 7/2010 | Levine et al. |
| 2010/0189052 A1* | 7/2010 | Kavanagh ........ H04L 29/12915 370/329 |
| 2010/0216525 A1 | 8/2010 | Bishop et al. |
| 2010/0218223 A1 | 8/2010 | Simpson et al. |
| 2010/0235175 A1 | 9/2010 | Donovan et al. |
| 2010/0251147 A1 | 9/2010 | Donovan et al. |
| 2010/0281503 A1 | 11/2010 | DeLorme et al. |
| 2010/0306394 A1* | 12/2010 | Brown ............. H04N 21/43615 709/229 |
| 2010/0333127 A1 | 12/2010 | Scott et al. |
| 2011/0085526 A1* | 4/2011 | Joseph ............. H04M 1/72533 370/338 |
| 2011/0103562 A1 | 5/2011 | Tritt |
| 2011/0119726 A1 | 5/2011 | DeLorme et al. |
| 2011/0126086 A1 | 5/2011 | Bedingfield, Sr. |
| 2011/0142059 A1 | 6/2011 | Bedingfield, Sr. et al. |
| 2011/0153116 A1 | 6/2011 | Bedingfield, Sr. et al. |
| 2011/0153738 A1 | 6/2011 | Bedingfield |
| 2011/0154207 A1 | 6/2011 | Bedingfield, Sr. |

* cited by examiner

REMOTE CONTROL VIA LOCAL AREA NETWORK

This application is a continuation of U.S. patent application Ser. No. 14/537,748, filed Nov. 10, 2014, issuing as U.S. Pat. No. 9,497,516 on Nov. 15, 2016, which is a continuation of U.S. patent application Ser. No. 12/636,407, filed Dec. 11, 2009, now U.S. Pat. No. 8,885,552, the entirety of each of which is incorporated by reference herein.

BACKGROUND

Field of the Disclosure

The present disclosure relates to remote control and, more particularly, to remote control of multimedia content using a multimedia content distribution network (MCDN).

Description of the Related Art

Various remote controls, including wireless and mobile devices, may be used with customer premises equipment (CPE) that are part of or connected to a MCDN to control viewing of multimedia content. Typical remote controls are dedicated devices that are used in a shared and anonymous manner.

DESCRIPTION OF THE EMBODIMENT(S)

Figure 1:
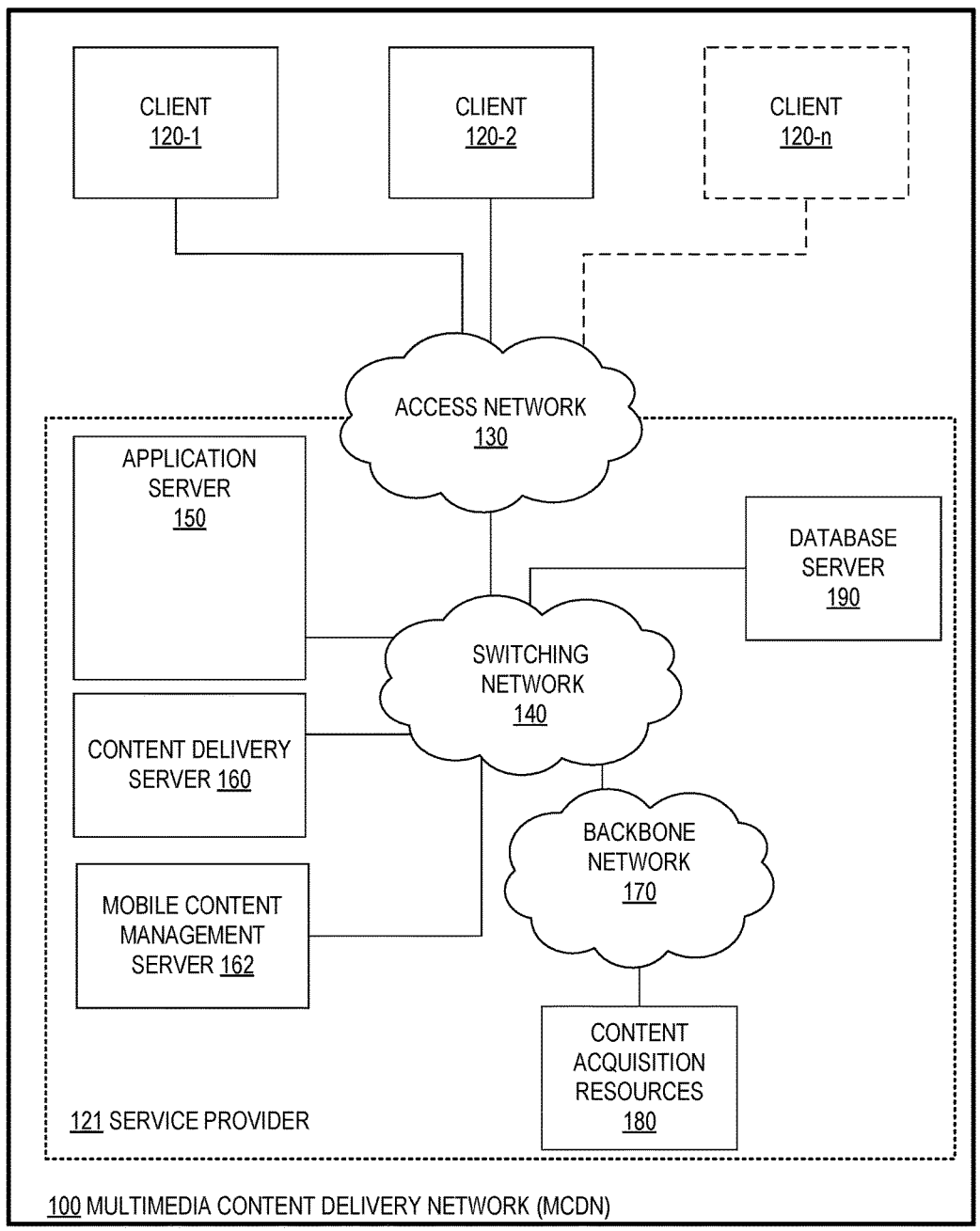
FIG. 1 is a block diagram of selected elements of an embodiment of a multimedia distribution network.

In one aspect, a disclosed method for enabling a user to remotely control multimedia content received over an MCDN, includes receiving, from a local area network (LAN) device, a remote control message addressed to an MCDN terminal device coupled to a CPE gateway, while the remote control message may indicate a remote control function executable by the MCDN terminal device. The remote control message may be received after the LAN connection between the LAN device and the CPE gateway to the MCDN terminal device has been established and the LAN device and the MCDN terminal device have been paired. The method may further include processing the remote control message, including sending the remote control message to the addressed MCDN terminal device. The LAN device may be a personal computer or a mobile electronic device.

In certain embodiments, the CPE gateway may be configured to receive and process remote control messages addressed to more than one MCDN terminal device coupled to the CPE gateway. The MCDN terminal device may be a multimedia-handling device coupled to a display device. The MCDN terminal device may be a gaming console coupled to a display device. In another embodiment, the MCDN terminal device may be a set-top box coupled to a display device. The remote control function may include selecting a desired multimedia program for at least one of: recording, scheduling, and viewing. The LAN connection may be a fixed network connection or a wireless network connection.

In particular embodiments, the method further includes determining an identity associated with a user of the LAN device, while the processing further includes authorizing the remote control message based on the determined identity.

In a further aspect, a disclosed CPE for use within a client configuration of an MCDN includes a processor, a LAN adapter, a wide-area network (WAN) adapter coupled to an MCDN server, and memory media accessible to the processor, including instructions executable by the processor. The processor instructions may be executable to determine an identity associated with a user of a LAN device connected via the LAN adapter to the CPE gateway, and receive, from the LAN device, a remote control message indicative of a remote control function for an MCDN terminal device coupled to the CPE gateway. Based in part on the identity, the processor instructions may further be executable to determine that the user is authorized to control the MCDN terminal device, and send the remote control message to the MCDN terminal device.

In some embodiments, the CPE further includes a local wireless router, and while the LAN connection may be a wireless network connection via the local wireless router. The wireless network connection may substantially conform to at least one wireless network standard defined by: IEEE 802.11, IEEE 802.15.1, and IEEE 802.15.4. The remote control message may include an alphanumeric user input.

In certain instances, the processor executable instructions to determine said identity may further include processor executable instructions to use the WAN adapter to query the MCDN server for an MCDN user account associated with an identifier for the LAN device.

In yet another aspect, disclosed computer-readable memory media include executable instructions for remote control of multimedia content provided by an MCDN. The instructions may be executable to determine an identity associated with a user of a LAN device connected via the LAN adapter to a CPE gateway, and receive, from the LAN device, a remote control message addressed to an MCDN terminal device coupled to the CPE gateway and paired to the LAN device, while the remote control message may be indicative of a remote control function for the MCDN terminal device. Based in part on the identity, the instructions may also be executable to determine whether the user is authorized to execute the remote control function on the addressed MCDN terminal device. If the user is authorized, the instructions may be executable to route the remote control message to the addressed MCDN terminal device. In some instances, the identity may not be authorized to access the selected MCDN terminal device, irrespective of the remote control function. If the status in the MCDN terminal device changes, the instructions may be executable to transmit status change information in the MCDN terminal device to the paired LAN device.

In certain implementations, the instructions executable to determine the identity may further include instructions executable to query an MCDN server for an MCDN user account associated with an identifier for the LAN device. In certain implementations, further instructions executable to selectively de-pair the LAN device from the MCDN terminal device may be included.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, mobile content management server 162, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1), which may provide network services related to the distribution and viewing of multimedia content.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, and identifiers for various types of devices.

Figure 2:
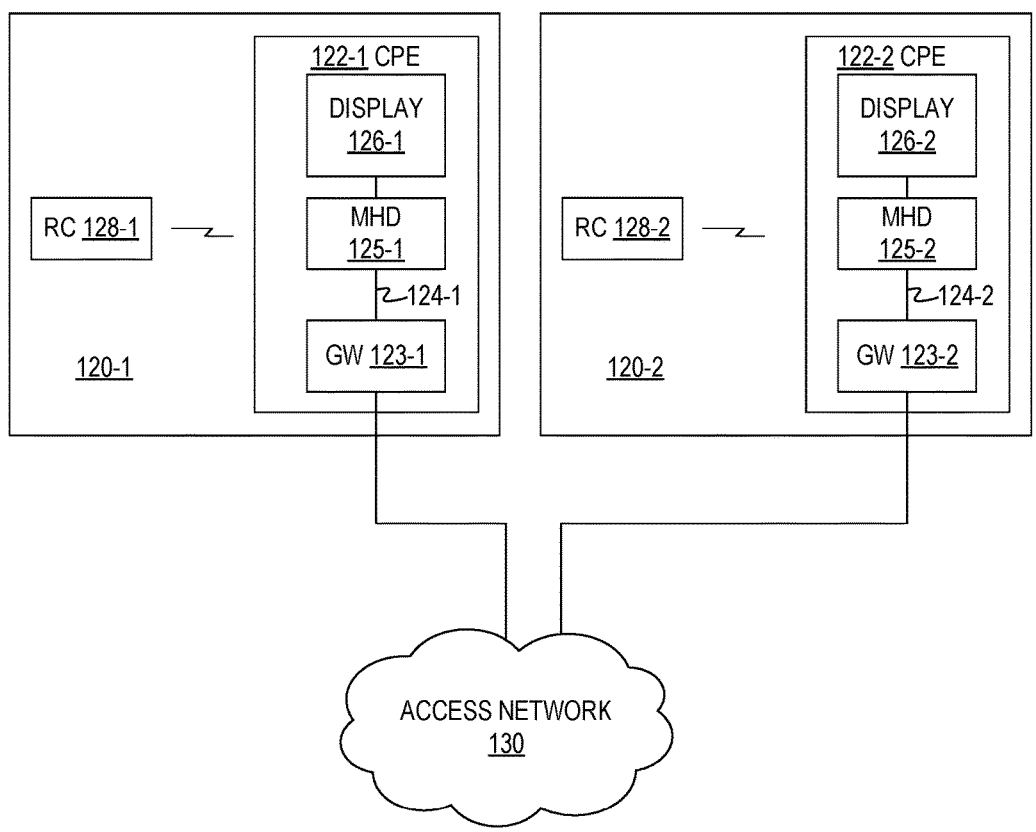
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side LAN 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, remote control 128 may be operable to configure remote viewing of multimedia content, and/or to activate remote viewing of multimedia content, as will be described in detail below.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set-top box suitable for use in a coaxial or IP-based multimedia content delivery network.

Figure 3:
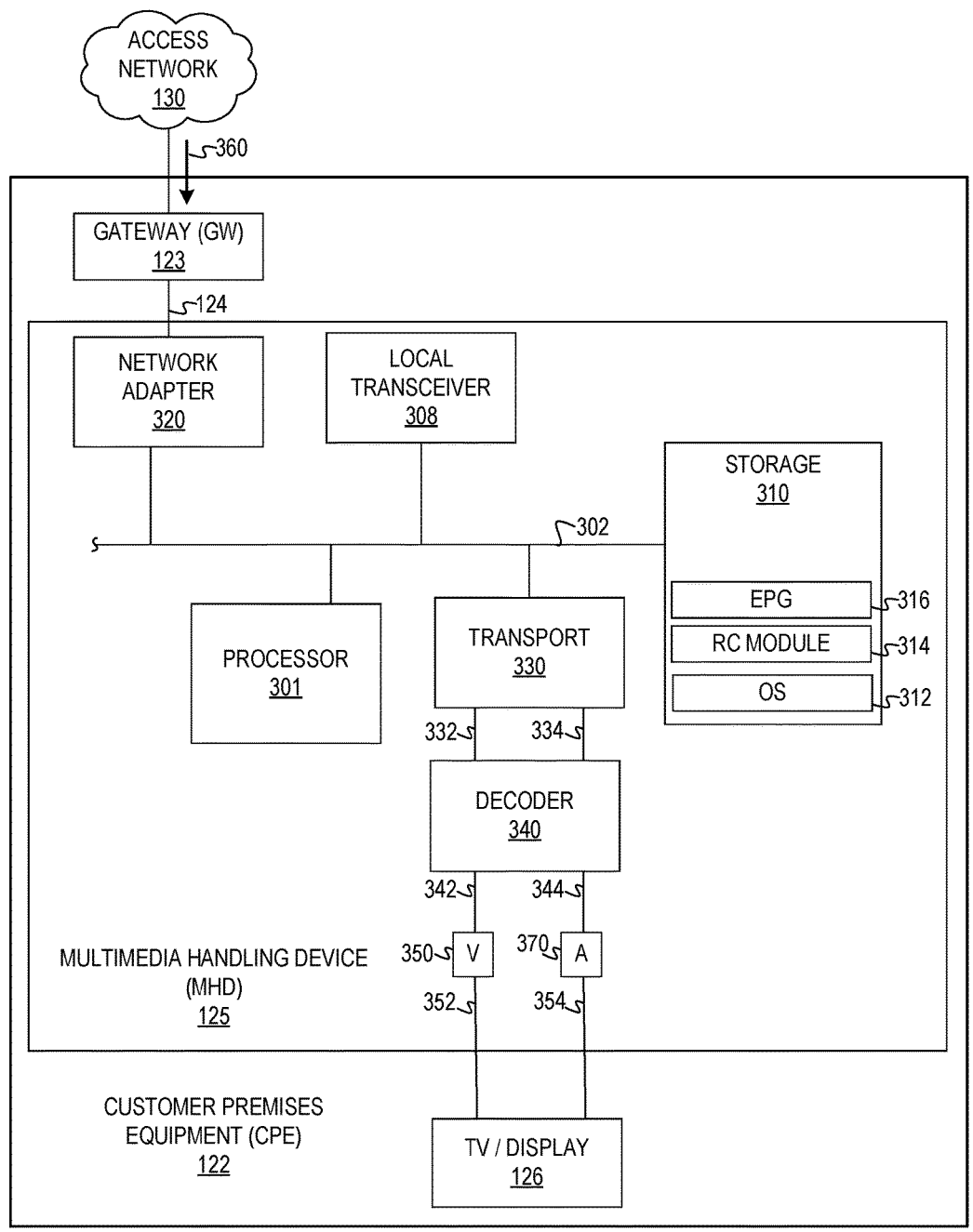
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Local transceiver 308 represents an interface of MHD 125 for communicating with external devices, such as remote control 128, or another device. Local transceiver 308 may provide a mechanical interface for coupling to an external device, such as a plug, socket, or other proximal adapter. In some cases, local transceiver 308 may be a wireless transceiver, configured to send and receive IR or RF or other signals. In particular embodiments, local transceiver 308 may be accessed by RC module 314 for providing remote control functionality. As will be described in detail below, certain embodiments of RC module 314 may be configured to receive remote control commands for MHD 125 via GW 123 from a LAN device (not shown in FIG. 3) coupled to LAN 124.

Figure 4:
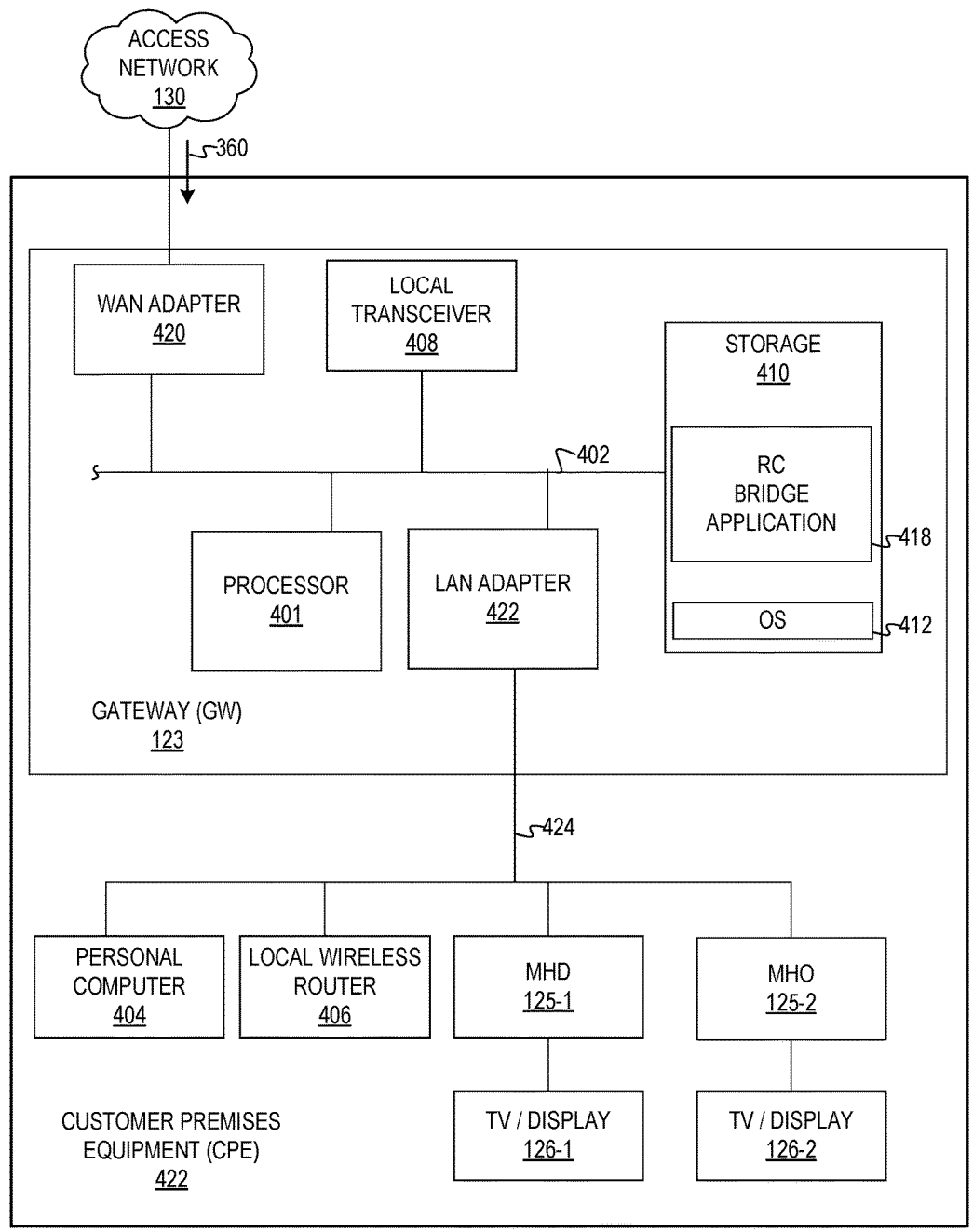
FIG. 4 is a block diagram of selected elements of an embodiment of a multimedia distribution network device.

Turning now to FIG. 4, one embodiment of CPE 422, including selected elements of a detailed embodiment of GW 123, is shown. In FIG. 4, GW 123 is shown as a functional component of CPE 422 along with personal computer 404, local wireless router 406, MHDs 125-1 and 125-2, and displays 126-1 and 126-2. It is noted that CPE 422 may represent one embodiment of CPE 122 (see FIGS. 2-3). The elements depicted in CPE 422 may be arranged independent of any physical implementation, as discussed above with respect to FIGS. 2-3. In particular, it is noted that CPE 422 may be embodied as any physical or mechanical combination of GW 123, MHD 125 and display 126, or other elements. It further is noted that like numbered elements depicted in FIG. 4 represent identical elements in FIGS. 1-3.

In the embodiment depicted in FIG. 4, GW 123 includes processor 401 coupled via shared bus 402 to storage media collectively identified as storage 410. GW 123, as depicted in FIG. 4, further includes WAN adapter 420 that interfaces GW 123 to access network 130 and through which GW 123 receives multimedia content 360. GW 123 is further shown coupled to LAN 424 via LAN adapter 422, thereby providing connectivity to other devices included with CPE 422, as will be discussed in further detail below. GW 123 may so serve as a bridge between access network 130 and LAN 424, while receiving multimedia content 360 from access network 130. As will be described in further detail, the bridge functionality of GW 123 may include forwarding remote control messages to "MCDN terminal device(s)", which, as used herein, refers to MHD devices configured to receive and display multimedia content via the MCDN, and configured to be remotely controlled. MCDN terminal devices may include MHD 125-1 which is depicted as a set-top box in FIG. 4 and MHD 125-2 which is depicted as a gaming console in FIG. 4. As referred to herein, a "LAN device" is a personal device associated with a user that is configured for LAN connectivity and configured to store and execute program instructions.

Storage 410 encompasses persistent and volatile media, fixed and removable media, and magnetic and semiconductor media. Storage 410 is operable to store instructions, data, or both. Storage 410 as shown may include sets or sequences of instructions, namely, an operating system 412, and remote control (RC) bridge application 418. Operating system 412 may be a UNIX or UNIX-like operating system, a Windows® family operating system, or another suitable operating system. In some embodiments, storage 410 is configured to store and execute instructions provided as services to client 120 by application server 150, as mentioned previously. RC bridge application 418 may implement the bridge functionality of GW 123 for remote control by facilitating communication between LAN devices and MCDN terminal devices.

Local transceiver 408 represents an interface of GW 123 for directly communicating with external devices, such as remote control 128, or another device. Local transceiver 408 may provide a mechanical interface for coupling to an external device, such as a plug, socket, or other proximal adapter. In some cases, local transceiver 408 may be a wireless transceiver, configured to send and receive IR or RF or other signals.

LAN 424 may represent a fixed network, a wireless network, or a combination thereof. LAN 424 may represent an exemplary embodiment of LAN 124 (see FIGS. 2-3). In certain embodiments, local transceiver 408 and/or LAN adapter 422 may provide connectivity for and/or be in communication with LAN 424. LAN 424 may provide network services for interconnecting a number of devices, which may be located at a premises of an MCDN customer. As shown in CPE 422, an exemplary implementation of LAN 424 provides network connectivity for a number of different types of LAN devices and MCDN terminal devices, such as personal computer 404, local wireless router 406, MHD 125-1 (set-top box), and MHD 125-2 (gaming console).

Personal computer 404 may represent at least one personal computer coupled to GW 123 for the purpose of obtaining wide-area network access via access network 130. Personal computer 404 may also serve as a LAN device for emulating remote control application. In one embodiment, personal computer 404 is provided network access to the Internet with an MCDN account using service provider 121 (see FIG. 1). Local wireless router 406 may serve as a bridge to a wireless network segment at the premises where CPE 422 is located, and may include wireless networking components to establish the wireless network segment. Local wireless router 406 may provide connectivity to LAN 424 for various types of LAN devices, such as, but not limited to, wireless communications devices, imaging devices, cameras, portable media players, personal wireless devices, and personal computers. MHD 125-1 may be a set-top box and serve as an MCDN terminal device coupled to TV/display 126-1, and represent an embodiment of television device, such as an IPTV device (see FIGS. 2-3). MHD 125-2 may be a gaming console and may serve as an MCDN terminal device representing a system for playing multimedia games and may be coupled to TV/display 126-2.

Figure 5:
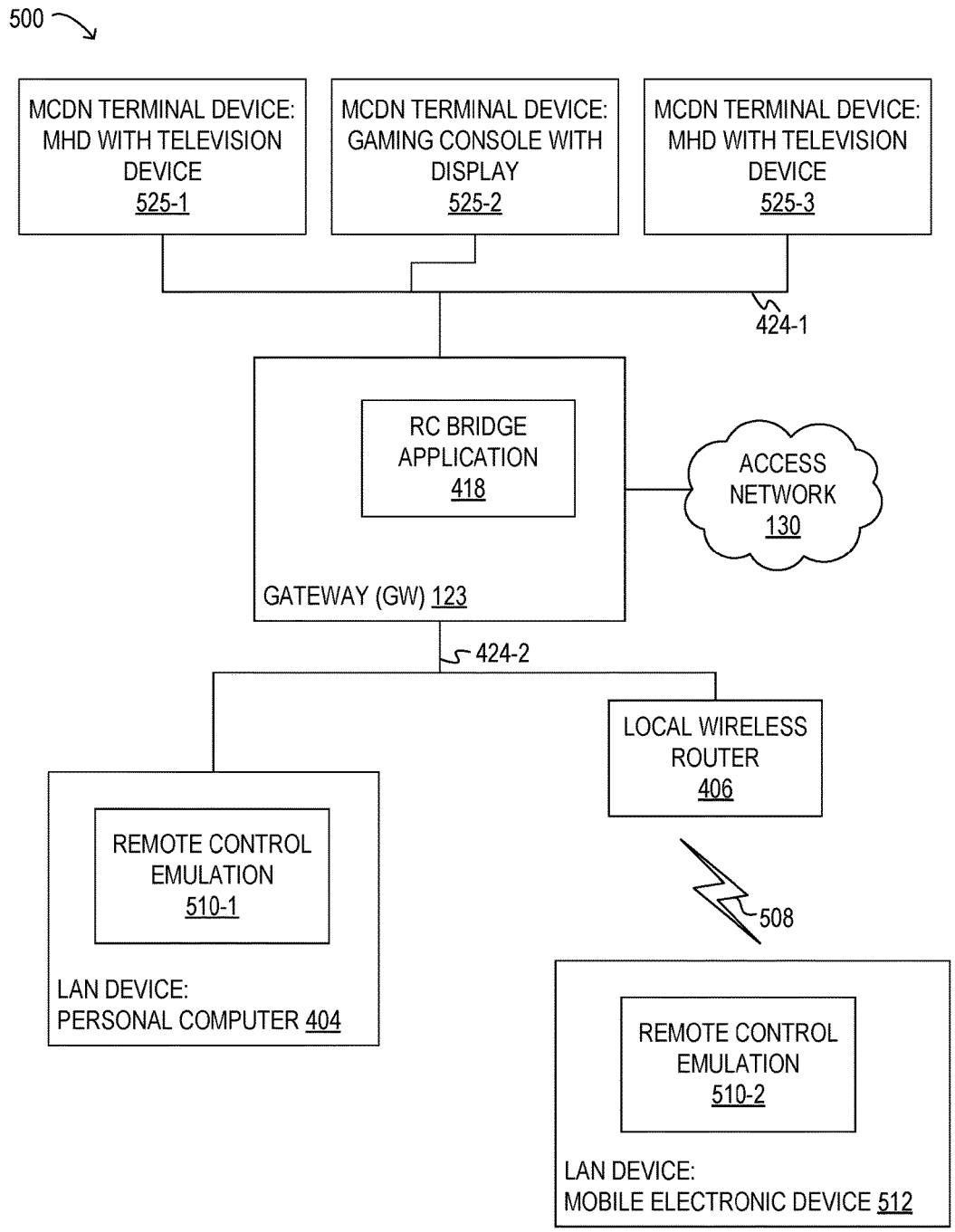
FIG. 5 is a block diagram of selected elements of an embodiment of a multimedia distribution network.

Referring now to FIG. 5, a block diagram illustrating selected elements of an embodiment of MCDN system 500 is presented. MCDN system 500 is shown with selected elements for providing remote control functionality. It is noted that like numbered elements depicted in FIG. 5 represent identical elements in FIGS. 1-4.

In MCDN system 500, access network 130 represents a client side of the MCDN client server model, as presented in FIG. 1. Access network 130 is shown coupled to GW 123, representing equipment associated with one of a plurality of MCDN clients (not shown in FIG. 5).

On the MCDN client side, GW 123 is shown coupled to LAN 424 (see also FIG. 4) for providing connectivity to a number of MCDN terminal devices. LAN 424 is shown for clarity in MCDN system 500 having two segments: LAN 424-1 depicts a LAN segment connecting a number of MCDN terminal devices, while LAN 424-2 depicts a LAN segment connecting exemplary LAN devices.

In MCDN system 500, LAN 424-1 is directly coupled to the following representative MCDN terminal devices: MHD with television device 525-1, gaming console with display 525-2, and MHD with television device 525-3. It is noted that GW 123 may be configured to route information via LAN 424-1 to a particular MCDN terminal device based on a network address (not shown in FIG. 5). For example, such a network address may allow GW 123 to distinguish MHD with television device 525-1 from MHD with television device 525-3, even though these devices may both be instances of the same device type such as set-top boxes. While LAN 424-1 is shown representing MCDN terminal devices at a single MCDN client location, it will be understood that access network 130 is configured to provide connectivity to a plurality of MCDN client sites with various numbers and types of MCDN terminal devices.

In FIG. 5, LAN 424-2 is shown providing a fixed network connection to personal computer 404, which is shown as a LAN device. LAN 424-2 is also depicted in MCDN system 500 coupled to local wireless router 406, which, in turn, may provide connectivity to mobile electronic device 512 via local wireless network 508, representing another LAN device accessible by GW 123. Local wireless network 508 may substantially conform to any one or more wireless network standards, such as an IEEE 802.11 LAN standard (WiFi), an IEEE 802.15. personal area network (PAN) standard (Bluetooth), or an IEEE 802.15.4 mesh network standard (ZigBee). Mobile electronic device 512 may represent a wireless communication device, a portable media player, an imaging device, a multimedia display device, or a mobile device with various combined features. Personal computer 404 and mobile electronic device 512 are shown configured to execute remote control emulation 510-1 and 510-2, respectively. Remote control emulation 510 may represent executable instructions to emulate functionality provided by a dedicated remote control, such as RC 128 (see FIG. 2). In certain embodiments, remote control emulation 510 may provide functionality, such as, but not limited to: alphanumeric text input, configurable menu control, configurable control elements, storage of user preferences, and access to MCDN servers and MCDN account data. For example, remote control emulation 510 may be configured to access and display user settings for an MCDN account.

In operation, GW 123 may be configured to transmit, or stream, multimedia content to a number of different kinds of MCDN terminal devices, including MHD with television device 525-1 and 525-2, as well as gaming console with display 516. Such MCDN terminal devices may be configured to display the multimedia content. In certain embodiments, a terminal service (not shown in FIG. 5) may execute on the MCDN terminal device for receiving and displaying the multimedia content.

GW 123 may further be configured to identify a user associated with a LAN device, such as personal computer 404 and mobile electronic device 512. The user may be identified based on an identifier for the LAN device, or other information, such as MCDN account information. GW 123 may determine whether the user is authorized to send remote control commands to an MCDN terminal device using a LAN device. GW 123 may communicate with an MCDN server, such as application server 150 (see FIG. 1), for authorizing the user. In certain embodiments, the user may be authorized to send certain remote control commands, while being restricted from sending other remote control commands. A user may further be authorized to send remote control commands only to specified MCDN terminal devices.

In a further embodiment, GW 123 connected to LAN 424 may be able to determine which LAN devices are capable of communicating with associated MCDN terminal devices 525. In this embodiment, one or more LAN devices may be paired with one or more MCDN terminal devices 525 so that the LAN devices are authorized to send remote control commands to a particular MCDN terminal device 525 by way of RC bridge application 418 of GW 123 for control of the associated MCDN terminal devices 525; while other LAN devices that are capable of communicating with one or more MCDN terminal devices 525 are not paired, and thus, not authorized to send remote control commands to a particular MCDN terminal device 525 associated with GW 123. In certain embodiments, all LAN devices capable of communicating with a particular MCDN terminal device 525 may be paired with such MCDN terminal device 525. In other embodiments, all LAN devices capable of communicating with a particular MCDN terminal device 525 may be paired with all MCDN terminal devices that are designated within a particular LAN (such as all MCDN terminal devices 525 connected to a specified network). In further embodiments, the pairing of a LAN device to one or more MCDN terminal devices 525 may be restricted to certain authorized users of the LAN device. In some embodiments, remote control commands sent by LAN devices emulate remote control commands that would be sent by a standard infrared or radio controlled remote control configured to control the applicable MCDN terminal device. In other embodiments, remote control commands sent by LAN devices are capable of directly setting the desired state in the applicable MCDN terminal device by way by way of RC bridge application 418 of GW 123.

Once paired, MCDN terminal device 525 is configured to communicate status (or state) information to any or all LAN devices to which it is paired. In this way, should current status information for MCDN terminal device 525 change (for example, delivery of applicable multimedia content has been paused), the current status of MCDN terminal devices 525 (in this example, that the delivery of applicable multimedia content has been paused) would be communicated to applicable LAN devices paired to the MCDN terminal devices 525. In one embodiment, MCDN terminal devices 525 is configured to multicast status change information over the applicable networks to which it is connected and each LAN device is configured to listen for status change information. In this way, a LAN device paired with a particular MCDN terminal devices 525 would listen for status change information from the particular MCDN terminal devices 525. Status change information would be multicast as soon as change in status occurred. When initially paired, the LAN device would obtain the current status information from the particular MCDN terminal devices 525.

It will be appreciated that instances may occur where it may no longer be desirable for a particular LAN device to be paired with a particular MCDN terminal devices 525. In one embodiment, a menu may be presented to a user of a LAN device by way of display 126-1 or a display connected to the LAN device to de-couple or un-pair the particular LAN device from the applicable MCDN terminal devices 525. In another embodiment, while the LAN device may automatically be de-coupled in response to being disconnected from the network, the LAN device would automatically be re-paired in response to being re-connected to the network.

In this way, personal computer 404 and mobile electronic device 512 may be selectively paired, and later may be selectively un-paired, with any of MCDN terminal devices 525 so as, for example, to send remote control commands by way of RC bridge application 418 of GW 123 to MCDN terminal device 525-1. Should personal computer 404 send a remote control command by way of RC bridge application 418 of GW 123 to MCDN terminal device 525-1, MCDN terminal device 525 would communicate with mobile electronic device 512 so as to inform mobile electronic device 512 of the current status of MCDN terminal device 525-1 following receipt of the remote control command from personal computer 404. Thus, if personal computer 404 were to send a command to pause the delivery of multimedia content to MCDN terminal device 525-1, mobile electronic device 512 would be aware of the current status of MCDN terminal device 525-1 such that a user of mobile electronic device 512 would know that the delivery of multimedia content to MCDN terminal device 525-1 had been paused. In this way, the embodiment synchronizes each LAN device paired with an applicable MCDN terminal devices 525. It will be appreciated, that such synchronization may be selectively enabled so that only designated LAN devices are synchronized. It will be appreciated that in order to facilitate the selective pairing, un-pairing, and synchronization of LAN devices with a MCDN terminal device 525, a user selectable name may be associated with one or more of the applicable LAN devices.

After authorization and while paired, the user may then send a remote control command to control a desired MCDN terminal device. GW 123 may then determine a LAN network address of a desired (i.e., user selected) MCDN terminal device, and forward the remote control command to the addressed MCDN terminal device. It is noted that GW 123 may be configured to address a plurality of MCDN terminal devices, for example, by communicating with a plurality of LAN devices. Sending the remote control command to the MCDN terminal device may cause the MCDN terminal device to execute a remote control function associated with the remote control command. The remote control function may include selecting a desired multimedia program for at least one of recording, scheduling, and viewing, among others. The remote control function may include multimedia handling capabilities provided by the MCDN. In this manner, the user may be provided with remote control functionality to remotely control the MCDN terminal device using the LAN device. The LAN device may be a personal device in possession of the user. The remote control functionality described above may be implemented in GW 123, for example by RC bridge application 418, in conjunction with remote control emulation 510.

Figure 6:
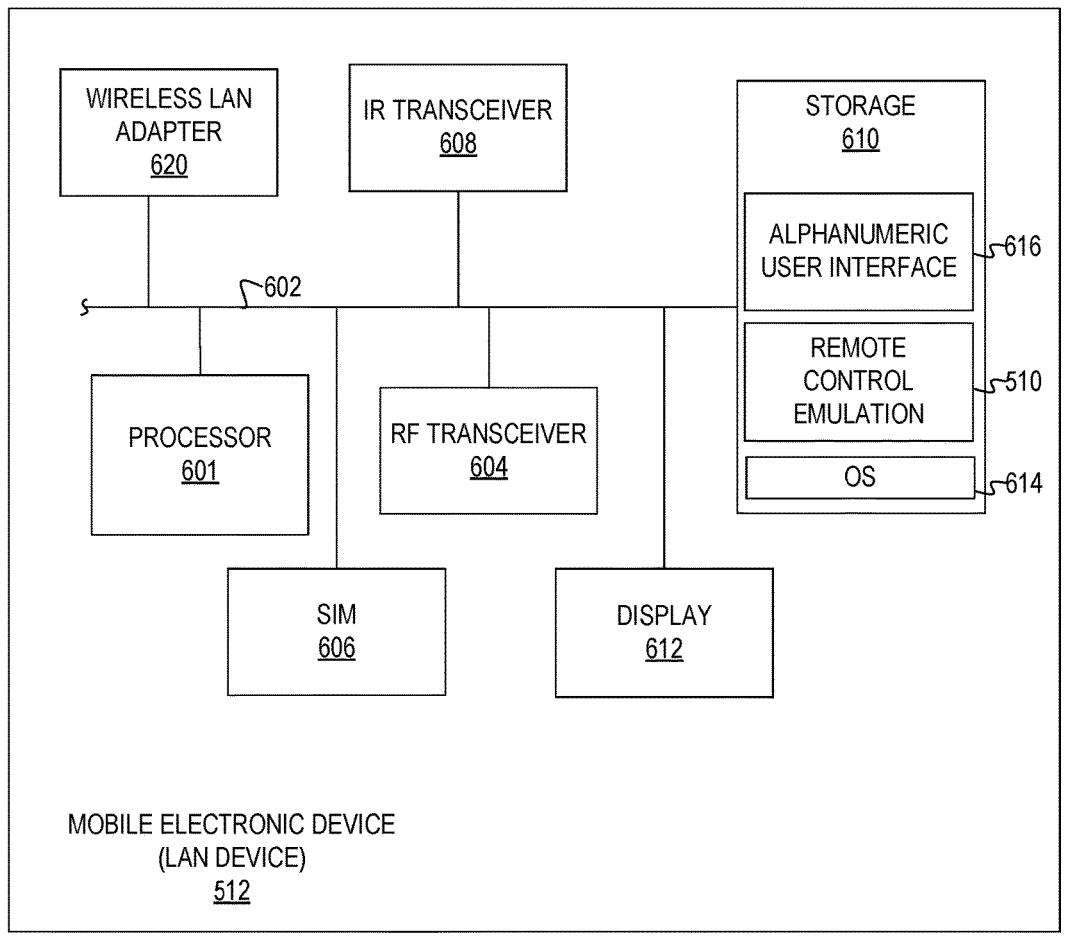
FIG. 6 is a block diagram of selected elements of an embodiment of a local area network device.

Turning now to FIG. 6, one embodiment of selected elements of mobile electronic device 512, representing an example embodiment of a LAN device, is shown. The elements depicted in mobile electronic device 512 may be arranged independent of any physical implementation, as discussed above with respect to FIGS. 2-3. In particular, it is noted that mobile electronic device 512 may be embodied as any physical or mechanical combination with display 612, or other elements. It further is noted that like numbered elements depicted in FIG. 6 represent identical elements in FIGS. 1-3.

In the embodiment depicted in FIG. 6, mobile electronic device 512 includes processor 601 coupled via shared bus 602 to storage media collectively identified as storage 610. Mobile electronic device 512, as depicted in FIG. 6, further includes wireless LAN adapter 620 that interfaces mobile electronic device 512 to wireless LAN 508 (see FIG. 5) and through which mobile electronic device 512 may send remote control commands for MCDN terminal devices. Mobile electronic device 512 is further shown with IR transceiver 608, which may be used to directly communicate with a remote-controlled device, such as an MCDN terminal device.

Also shown in mobile electronic device 512 is RF transceiver 604, which may be used to access a communications network, such as a wireless WAN (not shown in FIG. 6). In certain embodiments, mobile electronic device 512 may be configured to provide wireless telephony services, and may be serviced by a cellular wireless network. Accordingly, mobile electronic device 512 may include a subscriber identity module (SIM) 606 which may store a unique subscriber identity for providing service on a wireless WAN using RF transceiver 604.

In FIG. 6, mobile electronic device 512 may still further include display 612, which may provide a user interface and may also be used to display multimedia content. In certain embodiments, display 612 may include touch functionality, such as an embedded touch screen, for receiving user input.

Storage 610 encompasses persistent and volatile media, fixed and removable media, and magnetic and semiconductor media. Storage 610 is operable to store instructions, data, or both. Storage 610 as shown may include sets or sequences of instructions, namely, an operating system 614, and remote control emulation 510. Operating system 614 may be a UNIX or UNIX-like operating system, a Windows® family operating system, or another suitable operating system. Remote control emulation 510 may display an emulation of a remote control device on display 612, which may be used to send remote control commands via wireless LAN adapter 620 to GW 123 (not shown in FIG. 6). Storage 610 may further store alphanumeric interface 616 which may be used by remote control emulation 510 to provide a user interface. Alphanumeric interface 616 may enable emulation of various user interfaces, such as buttons, knobs, or even a full QWERTY keyboard and/or numeric keypads for facilitating input of descriptive text and other alphanumeric input.

Figure 7:
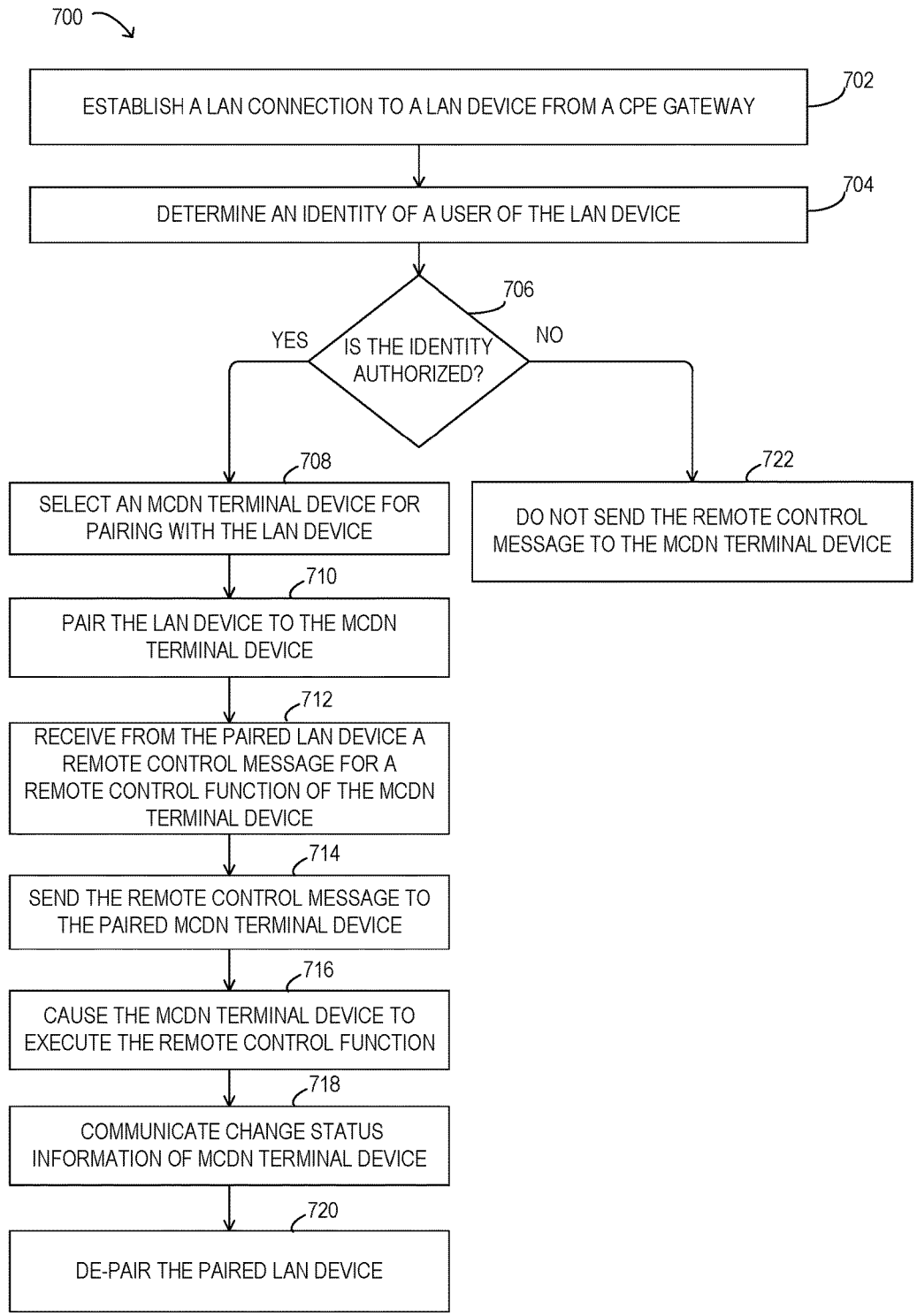
FIG. 7 is a flow chart illustrating selected elements of an embodiment of a method for remote control.

Turning now to FIG. 7, an embodiment of method 700 for remote control is presented in flow chart form. It is noted that method 700 may be executed by RC bridge application 418 and/or remote control emulation 510 (see FIGS. 5-6). In some embodiments, method 700 may further be executed, at least in part, by application server 150 (see FIG. 1). It is further noted that operations in method 700 may be rearranged or omitted, as desired.

A LAN connection to a LAN device from a CPE gateway to the MCDN terminal device may be established (operation 702). The LAN connection may be a wireless LAN connection, while the LAN device may be a mobile personal device. Communication between the LAN device and the MCDN terminal device may be encrypted. An identity of a user of the LAN device may be determined (operation 704). The user may be identified using an identifier associated with the LAN device. The user may be identified using MCDN account information, for example, by querying an MCDN server using a WAN adapter of the CPE gateway for an MCDN user account. In certain embodiments, the MCDN user account is associated with an identifier for the LAN device. The identity may include an indication whether the user is authorized to send remote control messages and/or to control MCDN terminal devices.

A determination may be made whether the identity is authorized to send the remote control message to the addressed MCDN terminal device (operation 706). If the result of operation 706 is NO, then the LAN device is not paired with the MCDN terminal device (operation 722). If the result of operation 706 is YES, then an MCDN terminal device for executing the remote control function may be selected for pairing with the LAN device (operation 708) and the MCDN terminal device is paired with the LAN device (operation 710). Selecting the MCDN terminal device may include determining a network address for the MCDN terminal device. While paired, a remote control message for a remote control function of an MCDN terminal device may be received from the LAN device (operation 712). The remote control message may be sent to the paired MCDN terminal device (operation 714). The remote control message may be sent by the LAN device in response to user input received by the LAN device. The user input may be provided during user interaction with a remote control emulation executing on the LAN device. The remote control message may include an alphanumeric user input. The remote control message may emulate remote control commands that would be sent by a standard infrared or radio controlled remote control configured to control a particular MCDN terminal device. In other instances, the remote control message may be capable of directly setting the desired state in the applicable MCDN terminal device to which it is directed. In certain embodiments, the remote control message received in operation 712 may include an indication, or a network address, for the MCDN terminal device. As a result of sending the message in operation 714, the MCDN terminal device may be caused to execute the remote control function (operation 716), whereupon the state of the MCDN terminal device will change accordingly. As a result of the state of the MCDN terminal device changing, the changed status (or state) information for the MCDN terminal device may be communicated to any or all paired LAN devices so that applicable LAN devices would obtain the current status (or state) information regarding the MCDN terminal device (operation 718). Following a determination to de-pair (or decouple) a LAN device, the applicable LAN device would no longer be paired (operation 720).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control method, comprising:
   detecting, by first terminal device coupled to a first segment of a local area network provided by a residential gateway, a local connection to a remote control emulator, wherein the remote control emulator is coupled to a second segment of the local area network and wherein the first segment and the second segment are coupled through a bridge of the residential gateway, wherein the residential gateway is configured to deliver multimedia content from an access network to one or more terminal devices coupled to the first segment and wherein the residential gateway includes a firewall between the one or more terminal devices and the access network;
   determining whether a user associated with the remote control emulator is an authorized user;
   pairing the remote control emulator and the first terminal device, wherein the first terminal device is configured to process the multimedia content for display on a display device; and
   responsive to receiving an emulated remote control signal indicative of a remote control function executable by the first terminal device, performing the remote control function.

2. The remote control method of claim 1, wherein the remote control emulator comprises a personal computer.

3. The remote control method of claim 1, wherein the remote control emulator comprises a mobile device.

4. The remote control method of claim 3, wherein the mobile device comprises a mobile telephone.

5. The remote control method of claim 1, wherein the local connection comprises a wireless connection.

6. The remote control method of claim 1, further comprising: responsive to detecting a status change associated with the first terminal device, sending information indicative of the status change to the remote control emulator.

7. The remote control method of claim 6, further comprising: de-pairing the remote control emulator and the first terminal device.

8. The remote control method of claim 1, further comprising:
   determining a user identity associated with the user of the remote control emulator;
   authorizing a remote control message indicative of the remote control function based on the user identity; and
   sending the remote control message to the first terminal device.

9. A multimedia content system, comprising:
   a gateway including:
      a processor coupled to a bus;
      a local transceiver coupled to the bus;
      a local area network adapter coupled to the bus;
      an access network adapter coupled to the bus; and
      memory media, accessible to the processor, including processor-executable instructions that, when executed by the processor, cause the processor to perform operations comprising:
         detecting, by a first terminal device coupled to an a first segment of a local area network provided by a residential gateway, a local connection to a remote control emulator, wherein the remote control emulator is coupled to a second segment of the local area network and wherein the first segment and the second segment are coupled through a bridge of the residential gateway, wherein the residential gateway is configured to deliver multimedia content from an access network to one or more terminal devices coupled to the first segment and wherein the residential gateway includes a firewall between the one or more terminal devices and the access network;

determining whether a user associated with the remote control emulator is an authorized user;

pairing the remote control emulator and the first terminal device, wherein the first terminal device is configured to process the multimedia content for display on a display device; and responsive to receiving an emulated remote control signal indicative of a remote control function executable by the first terminal device, performing the remote control function.

10. The multimedia content system of claim 9, wherein the remote control emulator comprises a personal computer.

11. The multimedia content system of claim 9, wherein the remote control emulator comprises a mobile device.

12. The multimedia content system of claim 11, wherein the mobile device comprises a mobile telephone.

13. The multimedia content system of claim 9, wherein the local connection comprises a wireless connection.

14. A non-transitory computer readable medium, including processor executable instructions that, when executed by a processor, cause the processor to perform operations including:

detecting, by a first terminal device coupled to a first segment of a local area network provided by a residential gateway, a local connection to a remote control emulator, wherein the remote control emulator is coupled to a second segment of the local area network and wherein the first segment and the second segment are coupled through a bridge of the residential gateway, wherein the residential gateway is configured to deliver multimedia content from an access network to one or more terminal devices coupled to the first segment and wherein the residential gateway includes a firewall between the one or more terminal devices and the access network;

determining whether a user associated with the remote control emulator is an authorized user;

pairing the remote control emulator and the first terminal device, wherein the first terminal device is configured to process the multimedia content for display on a display device; and responsive to receiving an emulated remote control signal indicative of a remote control function executable by the first terminal device, performing the remote control function.

15. The non-transitory computer readable medium of claim 14, wherein the local connection comprises a wireless connection.

16. The non-transitory computer readable medium of claim 14, wherein the operations include: responsive to detecting a status change associated with the first terminal device, sending information indicative of the status change to the remote control emulator.

17. The non-transitory computer readable medium of claim 14, wherein the operations include: de-pairing the remote control emulator and the first terminal device.

18. The non-transitory computer readable medium of claim 14, wherein the operations include: determining a user identity associated with s the user of the remote control emulator; authorizing a remote control message indicative of the remote control function based on the user identity; and sending the remote control message to the first terminal device.

* * * * *